US006394419B1

(12) United States Patent
Adams

(10) Patent No.: US 6,394,419 B1
(45) Date of Patent: May 28, 2002

(54) LIFTING APPARATUS

(76) Inventor: William Mark Adams, Sutton Lodge 33 Town Street, Sutton Oum Lound, Retford (GB), DN22 8PT ( * ) Notice: Subject to any disclaimer, the term of this patent is extended or adjusted under 35 U.S.C. 154(b) by 0 days.

(21) Appl. No.: 09/497,615

(22) Filed: Feb. 2, 2000

(30) Foreign Application Priority Data

Feb. 6, 1999 (GB) ............................................ 9902565
Jul. 29, 1999 (GB) ............................................ 9917805

(51) Int. Cl.$^{7}$ .................................................. B60P 1/00
(52) U.S. Cl. ...................................................... 254/9 C
(58) Field of Search ................................ 254/8 C, 9 C, 254/10 C, 122, 124, 88; 414/495, 349

(56) References Cited

U.S. PATENT DOCUMENTS 4,219,186 A * 8/1980 Brewer ....................... 254/9 C
5,397,209 A * 3/1995 Heim ......................... 254/9 C
6,102,370 A * 8/2000 Johnston ..................... 254/88

* cited by examiner

*Primary Examiner*—Robert C. Watson
(74) *Attorney, Agent, or Firm*—Woodard, Emhardt, Naughton Moriarty & NcNett

(57) ABSTRACT

A lifting apparatus for lifting articles or persons between raised and lowered positions comprising a base which is movable between raised and lowered positions and a support frame in relation to which the base is movable. Guide means are provided to guide the movement of the base between raised and lowered positions and power means are provided to allow the base to move between the positions. The apparatus is also provided with wheels or rollers which allow the apparatus to be moved along a surface and the wheels or rollers can be moved between an in-use position with the wheels contacting the surface and a retracted position with the wheels above the surface.

13 Claims, 4 Drawing Sheets

LIFTING APPARATUS

Figure 1A:
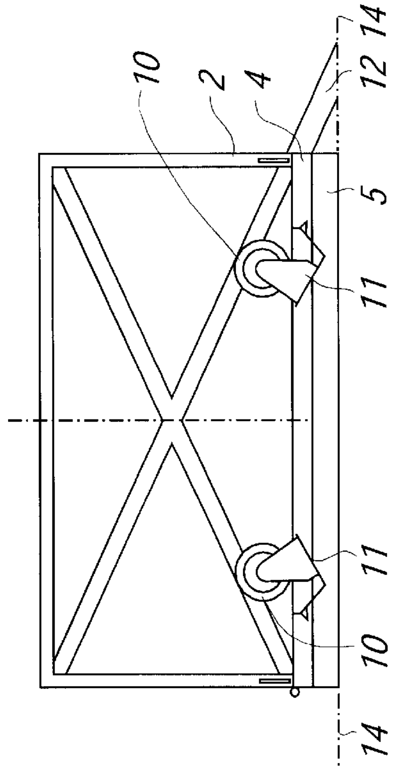

The invention which is the subject of this application relates to apparatus for lifting articles or persons between lowered and raised positions. The apparatus is provided in a lowered position to allow articles to be placed on or rolled onto a base from a surface and then raised or lowered on said base to a level to allow access of the article or person to another surface for example, such as would be used for the loading and unloading of articles onto the storage area of a lorry or trailer, or person onto rail carriages, buses or the like.

There are many different known forms of lifting apparatus, one of which is described in the Applicant's co-pending application No. WO 9711023. In this application, there is disclosed the provision of a lifting base which is movable between raised and lowered positions and, when in the lowered position, the base can be powered downwardly to move in relation to a supporting frame which is positioned to lie close to and parallel with the surface. The base can then be further powered downwardly towards the surface and, as it does so, contacts with the surface and causes the frame to be released from the surface. The base is typically provided with wheels or rollers protruding underneath the same such that when the base is powered down towards the surface, it, and the wheels and rollers move through the aperture defined by the frame and the wheels or rollers contact with the surface. In this position, the apparatus is movable about the surface to the required location. When the base is raised, the support frame returns to contact the surface and so, when the base is being raised or lowered the frame is held in constant, fixed position on the surface. This arrangement is particularly suited for the loading of vehicles with goods from and into warehouses or delivery points and where the base is required to carry a considerable number of articles all of which are to be stored and moved into the same location.

However, one problem of the disclosed apparatus is that the wheels or rollers protrude below the base to move the apparatus, the base is raised from the floor even when in a fully lowered position and this can make it difficult for items such as trolleys, wheelchairs and the like to be rolled onto the base. Another feature which can be a problem in certain uses is that it is not possible to have the apparatus movable when the base is in a raised position as the wheels or rollers are mounted on the base itself. This can be inconvenient when the apparatus is used for more frequent loading and unloading of items such as, for example, persons on wheelchairs.

The air of the present invention is to provide apparatus which has improved utility to suit specific requirements and uses of the same.

According to a first aspect of the present invention there is provided lifting apparatus comprising a base which is movable between raised and lowered positions, a support frame in relation to which said base is movable, guide means which guide the movement of the base between raised and lowered positions, power means which allow the base to be moved and wheels or rollers which allow the apparatus to be moved along a surface and wherein at least the wheels or rollers can be moved with respect to the apparatus between an in-use position in which they contact a surface and an out of use position with the wheels out of contact with the surface.

Preferably the wheels or rollers are mounted on a portion of the apparatus and movable with respect to that portion.

In one embodiment the wheels or rollers are mounted on the support frame, and movable with respect to the support frame. In an alternative embodiment the wheels or rollers are mounted on the base, and movable with respect to the base.

In one embodiment the wheels can be moved between in-use and out of use positions such that in the in-use position the wheels protrude from the bottom of the frame to allow the same to contact with the surface and in the out of use position the wheels are retracted such that the base can be moved closer to the surface than is the case with the wheels in an in-use position and this makes it easier for the moving of goods on and off said base from the surface.

In a further embodiment the wheels can be moved between an in-use position in which the wheels contact the surface and a retracted position with the wheels above the surface and the support frame in contact with the surface. In this position, the lifting apparatus stability is improved and goods can be moved easily from the base to the surface.

In one embodiment it is envisaged that the wheels will be mounted on members which, when in the in-use position, extend outwardly from the frame so that the wheels are positioned outwith the frame when contacting the surface.

In the in-use position, the wheels contact the surface and allow the apparatus to be moved across the surface. In one embodiment the wheels can be connected to the frame so that the wheels can be moved to the in-use position regardless of the position of the base relative to the frame, and also allow the apparatus to be moved across the surface with the base in a raised position.

Typically a ramp is provided which can be folded down to improve the rolling of articles to and from the base from the surface.

The wheels can be provided in connection with the base or alternatively the wheels can be provided in connection with the support frame.

The invention allows the base to be positioned significantly closer to the surface when the wheels are in an in use position.

In a further aspect of the present invention one or more jacks are provided on the support frame and the jacks can move between a raised position, with the jacks on the surface and the frame and wheels above the surface, and a retracted position with the wheels in use and in contact with the surface and the lifting apparatus thus movable across the surface. The wheels can be mounted on members which extend outwardly when in an in use position so that the wheels lie outwith the frame when contacting the surface.

The power means to move the base between raised and lowered positions, to move the wheels between in-use and out of use positions and/or to move the one or more jacks between a raised position and a retracted position can be provided by manually operated power means or, alternatively, powered drive means can be provided such as electrically or hydraulically powered drives.

The power means to move the wheels and/or the one or more jacks can be part of the same power means as that used to move the base between raised and lowered positions or, alternatively, separate power means are provided to operate the base, wheels and/or one or more jacks.

In one embodiment it is envisaged that the apparatus is of use for disabled persons and particularly those with wheelchairs to allow movement of said wheelchairs and persons to vehicles, buses or trains. When the apparatus is provided with a powered drive, it is of course possible that the person in the wheelchair on the base can be provided with control means to allow operation by them of the movement of the apparatus across the surface, thereby allowing increased independence to the disabled user. The control means can be permanently attached to the base or to members protruding from the base or may be provided with a flexible connection which allows the control means to be used by a person standing on the base and/or on the surface adjacent the apparatus.

Another envisaged use is in conjunction with vehicle trailers to allow the loading and unloading of goods to and from the trailers in the warehouses or at delivery points. It is therefore envisaged that each delivery point can be provided with the apparatus according to the invention so that there will be no need for the tail lift apparatus which is conventionally fitted to vehicles which offers significant reductions in cost of the vehicles.

In one alternative embodiment the apparatus is provided with attachment means to allow the same to be attached to the vehicle trailer to allow the same to be carried with and/or used in conjunction with the trailer in a manner typically as that of for example a tail lift. Preferably the apparatus has the significant advantage of being disengagable and movable into the delivery area or warehouse with the goods and thus provides the combination of a loading and unloading facility, and goods moving facility which is not possible with conventional tail lifts which are permanently fixed to the vehicles.

The invention will now be described with reference to the accompanying drawings, wherein:

FIGS. 1A–D illustrate the apparatus according to one embodiment of the invention for use with a vehicle storage area; and FIGS. 2A–D illustrate apparatus according to a second embodiment of the invention for use with disabled persons.

Figure 3B:
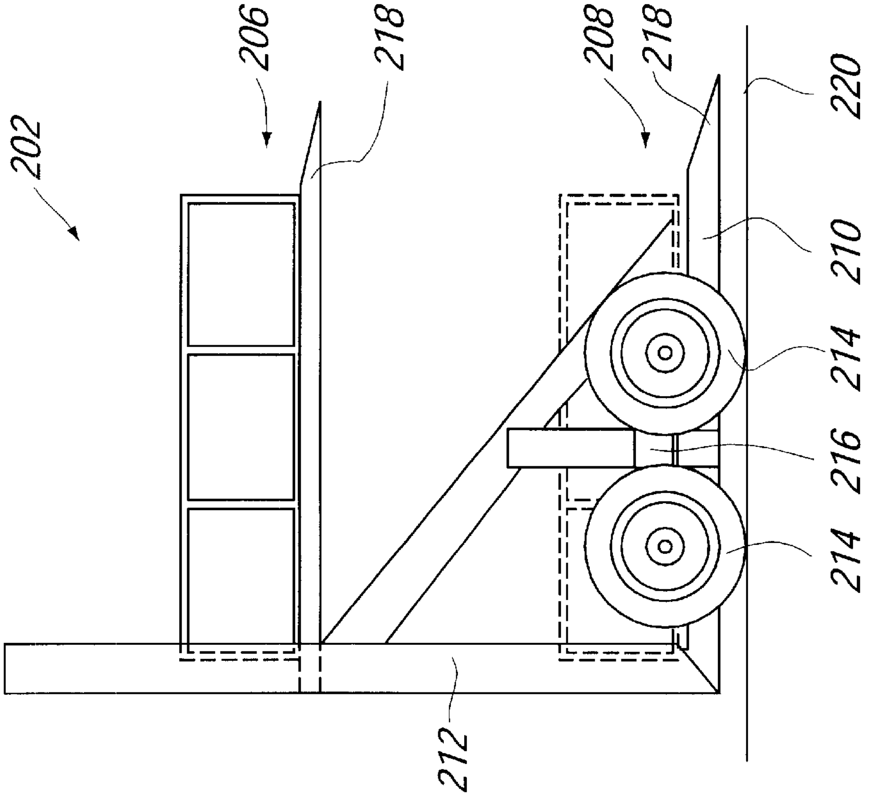
Figure 3A:
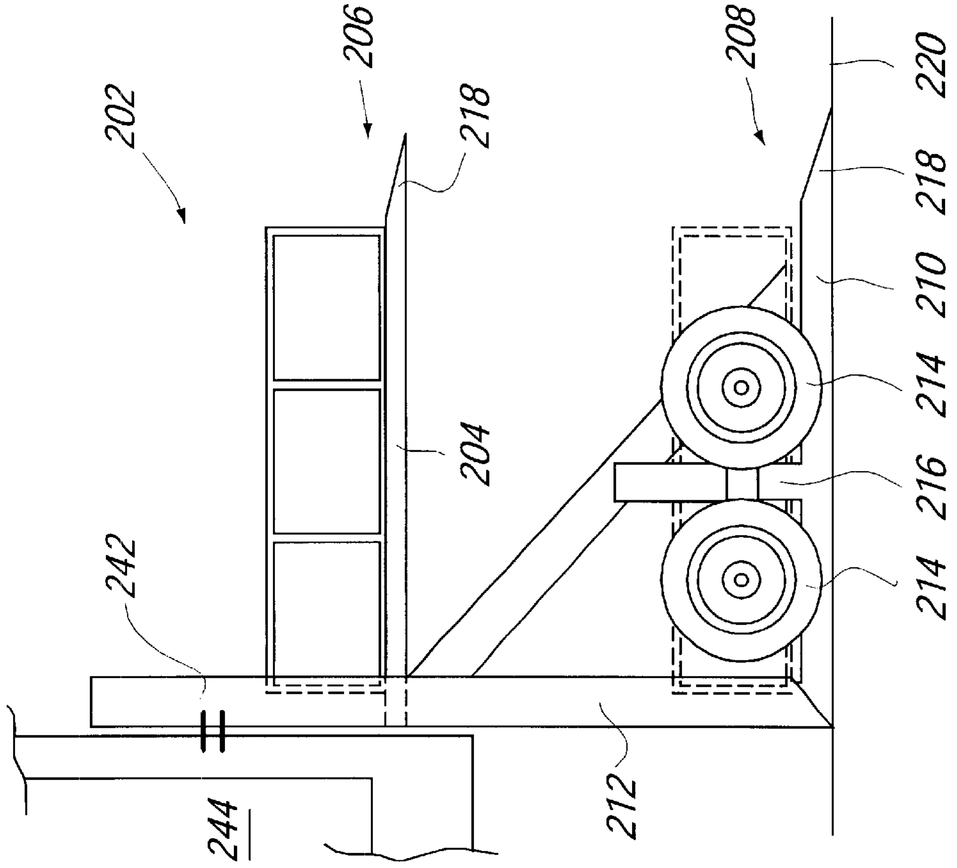

FIGS. 3A–B illustrates an embodiment of the invention with wheels of the lifting apparatus in retracted and in-use positions.

Figure 4B:
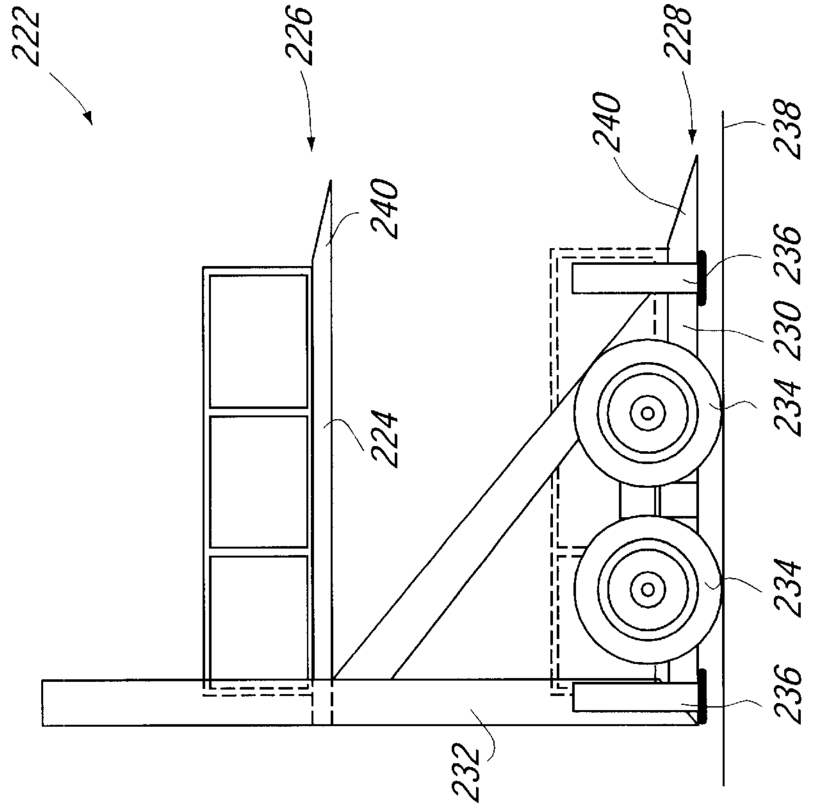
Figure 4A:
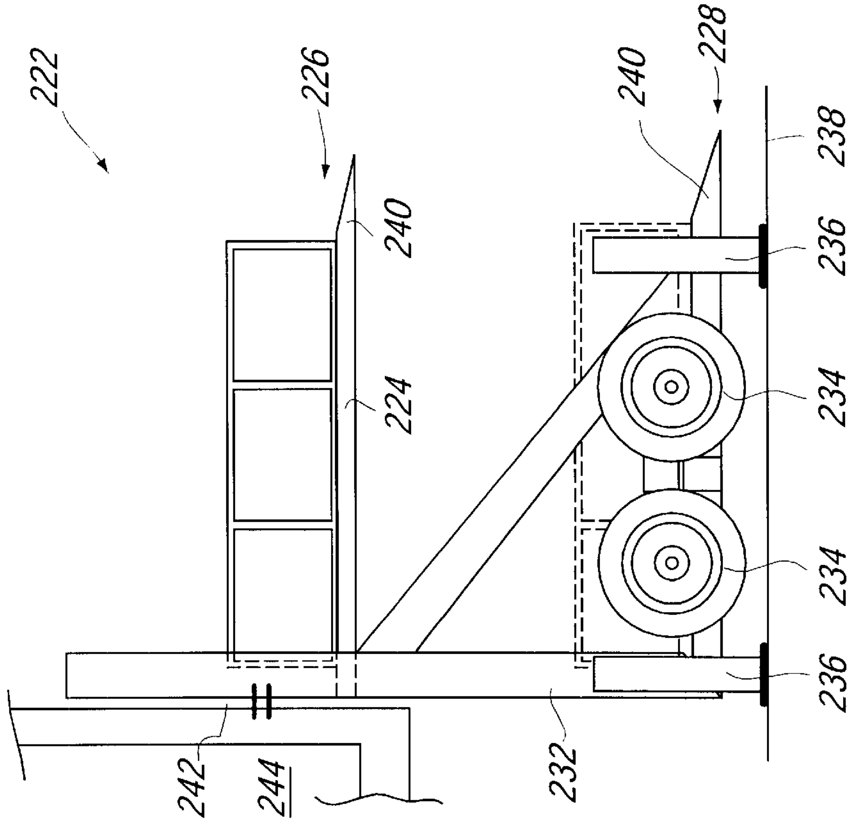

FIGS. 4A–B illustrates a further embodiment of the invention with jacks of the lifting apparatus in an in-use position and retracted position.

Figure 1B:
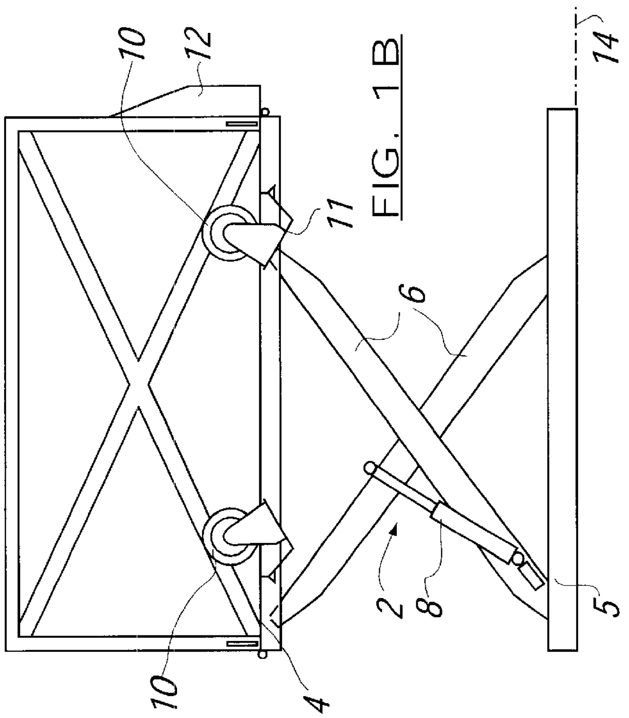
Figure 1C:
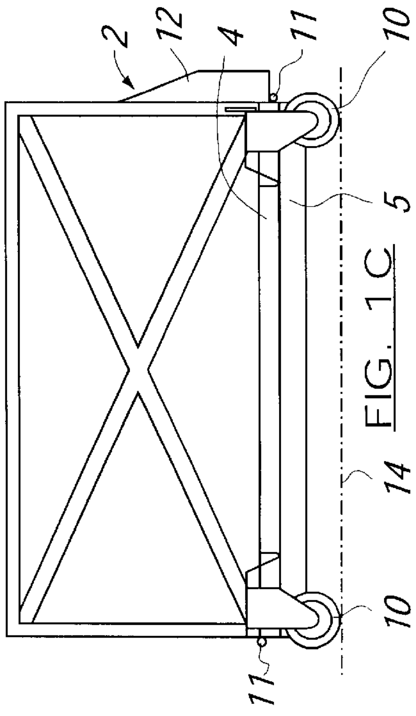
Figure 1D:
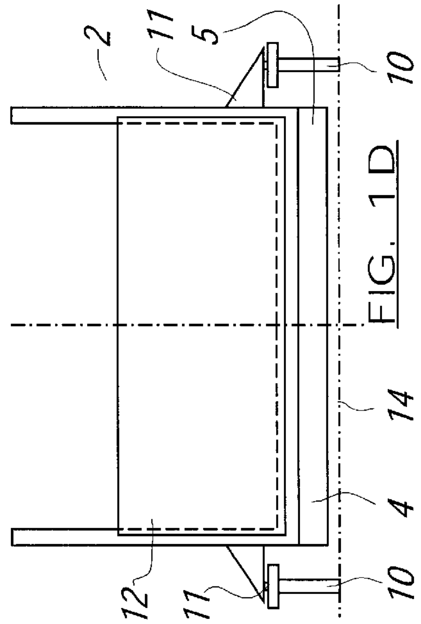

Referring now the drawings 1A–D, there is shown a lifting apparatus 2 according to the invention in one embodiment. Said lifting apparatus comprises a base 4 which is movable between raised and lowered positions as shown in FIGS. 1A and 1B, a frame 5 in respect of which said base is movable and, mounted on said frame, guide means 6 which control the movement of said base relative to the frame. In this case, the guide means 6 are provided in a scissor lift arrangement and there is provided a power drive by means of hydraulics and/or electrical drive 8 which causes the movement of the guide means and the base relative to the frame. In this embodiment the base 4 is provided with wheels 10 which are mounted on members 11 which are movable between a retracted position as shown in FIGS. 1A and 1B and an in use position as shown in FIGS. 1C and 1D. The base 4 is provided with a ramp 12 which improves the ease of moving articles onto and off the base, such as trolleys.

FIG. 1A illustrates how, with the wheels retracted, the ramp 12 can be lowered and the base 4 is positioned close to the surface 14 so as to allow the movement of goods onto and off the base. FIGS. 1C and 1D illustrate how, even with the wheels in the in use position, they are positioned to lie outwith the frame 5 and not underneath the base 4 so that the base can still lie relatively closer to the surface than is possible with the apparatus disclosed in the applicant's co-pending application.

Figure 2A:
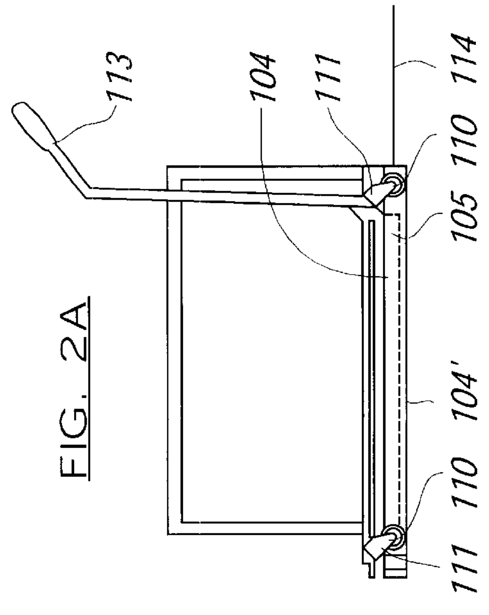
Figure 2B:
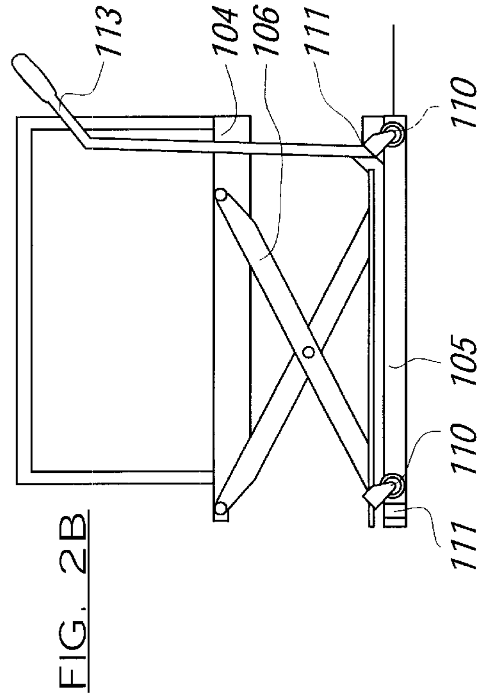
Figure 2C:
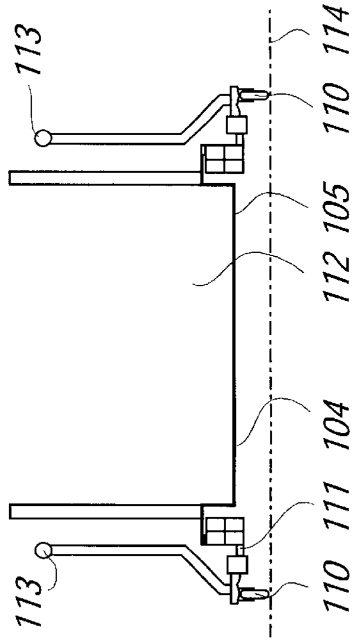
Figure 2D:
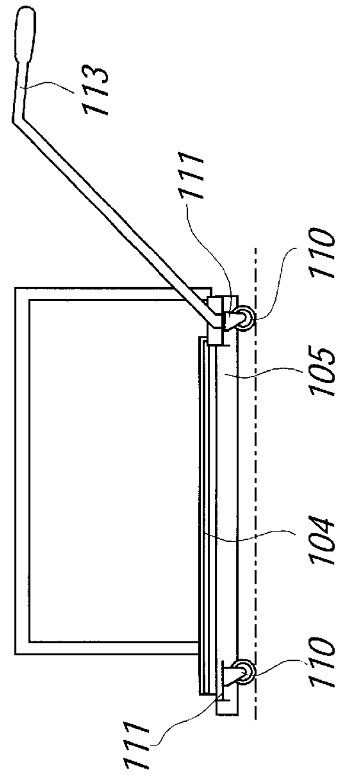

Referring now to FIGS. 2A–D, there is illustrated a further embodiment of the invention, wherein the apparatus is for use by disabled persons in wheelchairs and again comprises base 104, frame 105, guide means 106, drive ram (not shown) and wheels or rollers 110. In this case wheels are mounted on the frame 105 via members 111 which allow the same to be moved between a retracted position as shown in FIGS. 2A and 2B and an in use position whereupon the members extend outwardly and downwardly to allow contact with the surface. In this embodiment the wheels are moved between these position by movement of handles 113 between the positions shown in FIGS. 1A–B and 1C–D. Again it is shown that the base can be positioned low to the ground when the wheels are in the retracted and in use positions as the same are not positioned underneath the base. A ramp 112 can be provided to allow access to and from the base 104 when in a lowered position but it will be seen in FIG. 1A that the base 104 (shown in broken line 104') lies sufficiently close to the surface to allow a pushchair wheel chair or the like to be moved directly onto the base from the surface 114.

Referring now to FIGS. 3A–3B, there is illustrated a lifting apparatus 202 of a yet further embodiment of the invention. Said lifting apparatus comprises a base 204 which is movable between raised and lowered positions 206 and 208 respectively, a support frame 210 in respect of which said base is movable and, mounted on said frame, guide means 212 which control the movement of said base relative to the frame.

The support frame 210 is provided with wheels 214 which are mounted on members 216 and which are movable between a retracted position as shown in FIG. 3A to an in use position as shown in FIG. 3B. The base 204 and/or support frame 210 are provided with ramps 218 which improve the ease of moving articles onto and off the base, such as trolleys.

FIG. 3A illustrates how, with the wheels 214 retracted, the support frame 210 contacts the surface 220 to provide a stable support for the lifting apparatus 202. FIG. 3B illustrates how, with the wheels 214 in an in-use position, such that the wheels contact the surface 220, the support frame 210 is raised above said surface 220 and the lifting apparatus 202 is movable across the surface.

The base 204 is movable between raised and lowered positions, 206 and 208 respectively, when the wheels are in a retracted position as shown in FIG. 3A and/or when the wheels are in an in-use position as shown in FIG. 3B. With the wheels in a retracted position the base 204 can be positioned close to the surface 220 so as to allow the movement of goods onto and off the base.

Referring now to FIGS. 4A–B, there is illustrated a further embodiment of the invention, wherein a lifting apparatus 222 comprises a base 224 which is movable between raised and lowered positions 226 and 228 respectively, a support frame 230 in respect of which said base is movable and, mounted on said frame and guide means 232 which control the movement of said base relative to the frame.

The frame 230 is provided with wheels 234 and jacks 236, said jacks being movable between a raised position as shown in FIG. 4A and a retracted position as shown in FIG. 4B. With the jacks 236 in the raised position, the wheels 234 are raised above a surface 238 and the jacks make contact with the said surface to provide a stable support for the lifting apparatus 222. With the jacks 236 in a retracted position, the wheels 234 are in an in-use position and contact the surface 238 and the lifting apparatus 222 is thus movable across the surface.

In both FIGS. 4A and 4B the support frame 230 is raised above the surface 238 and said frame and/or base 224 are provided with ramps 240 to allow movement of goods onto and off said base. The lifting apparatus 222 is movable across the surface with the base 224 in either raised or lowered positions, 226 and 228 respectively.

The lifting apparatus can be provided with attachment means 242 to allow the same to be attached to the opening or openings of a vehicle trailer 244 to allow the same to be used in situ with the trailer in a manner typically as that of for example a tail lift, as illustrated in FIGS. 3A–B and FIGS. 4A–B.

A power means to move the base between raised and lowered positions, to move the wheels from an in-use position to a retracted position and/or to move the jacks from an in-use position to a retracted position can be provided by manually operated power means. Alternatively, powered drive means can be provided such as electrically or hydraulically powered drives.

The power means to move the wheels and/or the jacks can be either separate or joined to the power means provided to operate the base between raised and lowered positions.

It will also be appreciated by a person skilled in the art that the lifting apparatus can be provided with both retractable jacks and retractable wheels.

Control means can be provided to allow operation and movement of the base between raised and lowered positions by a person on said base. The control means can be permanently attached to the base or to members protruding from the base or may be provided with a flexible connection which allows the said control means to be used by a person standing on the base and/or on the surface adjacent the apparatus.

In use, and in whatever embodiment, the apparatus is movable about the surface by means of the wheels 10, 110, 214, 234 when in an in-use position to contact with the surface 114, 14, 220, 238 and also allows the base to be movable to a position closer to the surface than with conventional devices, thereby allowing improved ease of loading and unloading of goods. This is not possible with conventional apparatus in which, if the base can be moved close to the surface, such as with tail lifts for vehicles, the apparatus cannot then be moved across the surface or, if it can be moved across the surface, the base is raised considerably higher from the surface which makes the loading and unloading of goods, and particularly goods held in trolleys and the like, problematic. Thus, it will be appreciated that the invention of the apparatus as herein described has particular and specific uses, which cannot conveniently be provided by conventional apparatus.

What is claimed is:

1. Lifting apparatus comprising a base which is movable between a raised position and a lowered position, a support frame for the base and in relation to which said base is movable, guide means which guide the movement of the base between said raised position and said lowered position adjacent the support frame, power means which allow the base to be moved between the said raised and lowered position and wheels mounted on the apparatus which allow the apparatus to be selectively moved along a surface and wherein the wheels can be moved with respect to the surface between an in-use position in which they contact the surface and allow the apparatus to be moved across the surface, and an out of use position with the wheels out of contact with the surface, and are retained in the out of use position as said frame is moved between said raised and lowered positions.

2. Lifting apparatus according to claim 1 wherein the wheels are mounted on a portion of the apparatus, and movable with respect to that portion.

3. Lifting apparatus according to claim 1 wherein the wheels are mounted on the base, and movable with respect to the base.

4. Lifting apparatus according to claim 1 wherein the wheels are retracted to an out of use position to allow the base to be moved closer to the surface than would be the case with the wheels in an in-use position.

5. Lifting apparatus according to claim 4 wherein with the wheels retracted the support frame contacts the surface.

6. Lifting apparatus according to claim 1 wherein a ramp is provided which can be moved to allow the rolling of items to and from the base from the surface.

7. Lifting apparatus according to claim 1 wherein in an in-use position the wheels protrude from the bottom of the frame.

8. Lifting apparatus according to claim 1 wherein the wheels are mounted on members which, when in an in-use position, extend outwardly from the frame so that the wheels are positioned outwith the frame contacting the surface.

9. Lifting apparatus according to claim 1 wherein the wheels are mounted on members which extend outwardly from the frame and are attached to the frame so that in an in-use position the wheels lie out of the frame when contacting the surface.

10. Lifting apparatus according to claim 1 wherein the apparatus is powered by a manually operated power means to move the base, and wheels between raised and lowered positions.

11. Lifting apparatus according to claim 1 wherein the power driven means are electrical power drives.

12. Lifting apparatus according to claim 1 wherein the power drive means are hydraulic power drives.

13. A lifting apparatus movable across a supporting surface comprising:

a base which is movable from a raised position to a lowered position and vice-versa;

a support frame connected to said base and in relation to which said base is movable, said base when in said lowered position located adjacent said support frame;

a guide extending between said base and said support frame to guide said base between said raised position and said lowered position;

a power actuator extending between said base and said support frame to raise and lower said base relative to said support frame; and, wheels movably mounted to said base and having a downwardly extending in use position and a retracted out of use position, said wheels when in said in use position extending downwardly from said base and beneath said support frame supporting said base and said support frame upon a supporting surface while said base is in said lowered position adjacent said support frame allowing the apparatus to be moved across a supporting surface, said wheels when in said retracted out of use position allowing said support frame to rest on said supporting surface while said base is in said lowered position atop said support frame.

* * * * *

UNITED STATES PATENT AND TRADEMARK OFFICE

CERTIFICATE OF CORRECTION

PATENT NO. : 6,394,419 B1
DATED : May 28, 2002
INVENTOR(S) : William Mark Adams

It is certified that error appears in the above-identified patent and that said Letters Patent is hereby corrected as shown below:

Column 1,
Line 49, please change "air" to -- aim --.

Signed and Sealed this

Eighteenth Day of February, 2003

JAMES E. ROGAN
*Director of the United States Patent and Trademark Office*